United States Patent [19]
Turner

[11] Patent Number: 6,026,736
[45] Date of Patent: Feb. 22, 2000

[54] APPARATUS AND METHOD FOR COOKING FOOD

[76] Inventor: Darryl Eric Turner, 824 Cityscape Plaza, Atlanta, Ga. 30308

[21] Appl. No.: 09/108,220

[22] Filed: Jul. 1, 1998

[51] Int. Cl.[7] .............................. A47J 27/62; A47J 37/06
[52] U.S. Cl. ................................ 99/349; 99/347; 99/375; 99/379; 99/423; 99/425; 426/523
[58] Field of Search .............................. 99/349, 342, 345, 99/375, 379, 422, 423, 425, 389, 391, 400, 347; 426/312, 520, 523

[56] References Cited

U.S. PATENT DOCUMENTS 4,852,545  8/1989  Sherman et al. ...................... 99/349 X
4,972,766  11/1990 Anetsberger ......................... 99/349 X
5,755,150  5/1998  Matsumoto et al. .................. 99/379 X
5,934,182  9/1999  Harter et al. ......................... 99/379 X

*Primary Examiner*—Reginald L. Alexander

[57] ABSTRACT

A grill has top and bottom cooking surfaces with the top surface movable upward to load the grill and movable downward onto the food and bottom surface to cook the food. Different cooking surface zones may be heated individually to accommodate the amount and type of food. The top surface is lowered and pressed onto the food at about 140 psi to provide positive contact with the food. The cooking surfaces have grooves through which vapor from a heated marinade cup is channeled to steam the food and drain fat for removal. The marinade vapor replaces fat and natural juices producing a relatively low fat, moist cooked meat.

20 Claims, 8 Drawing Sheets

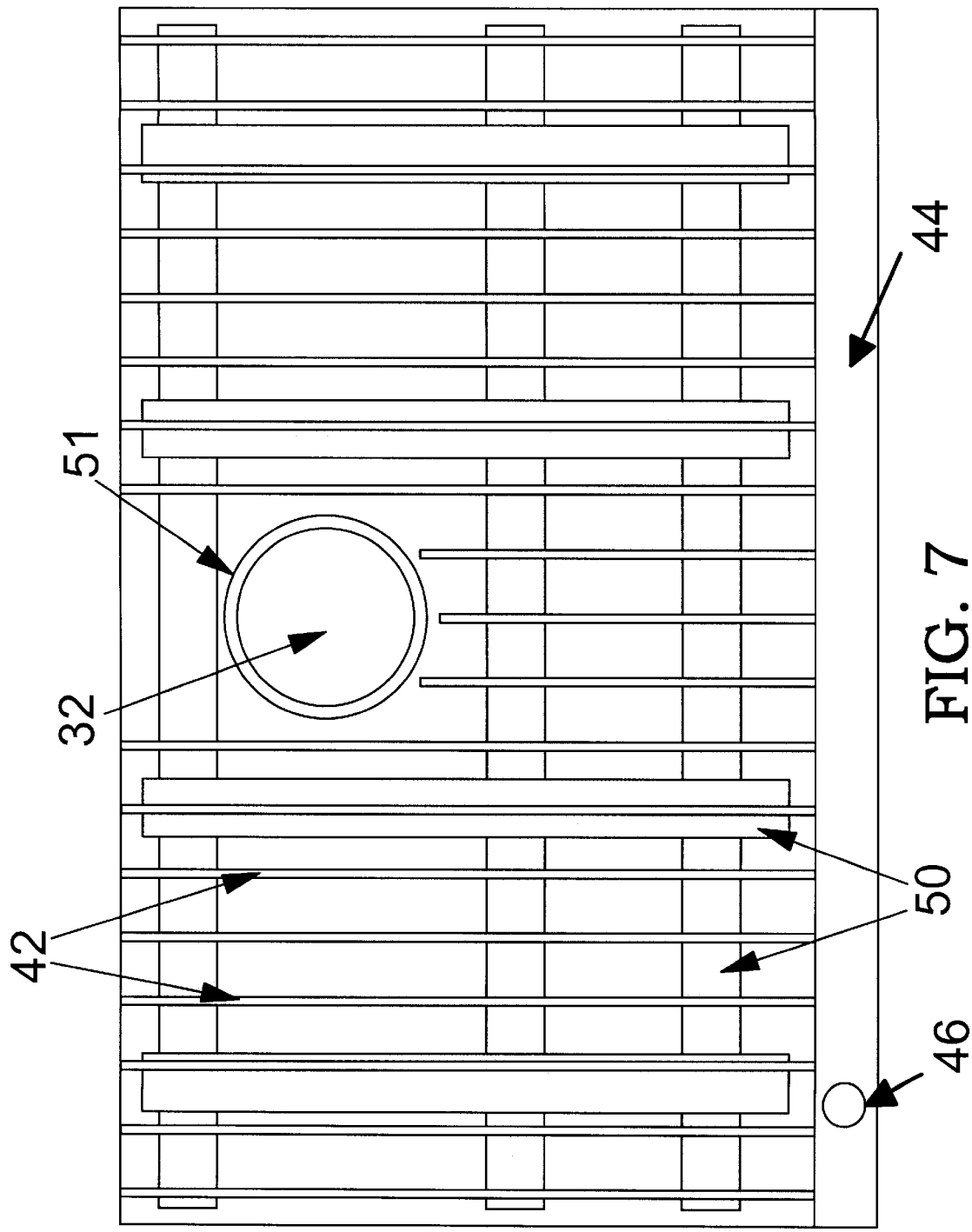

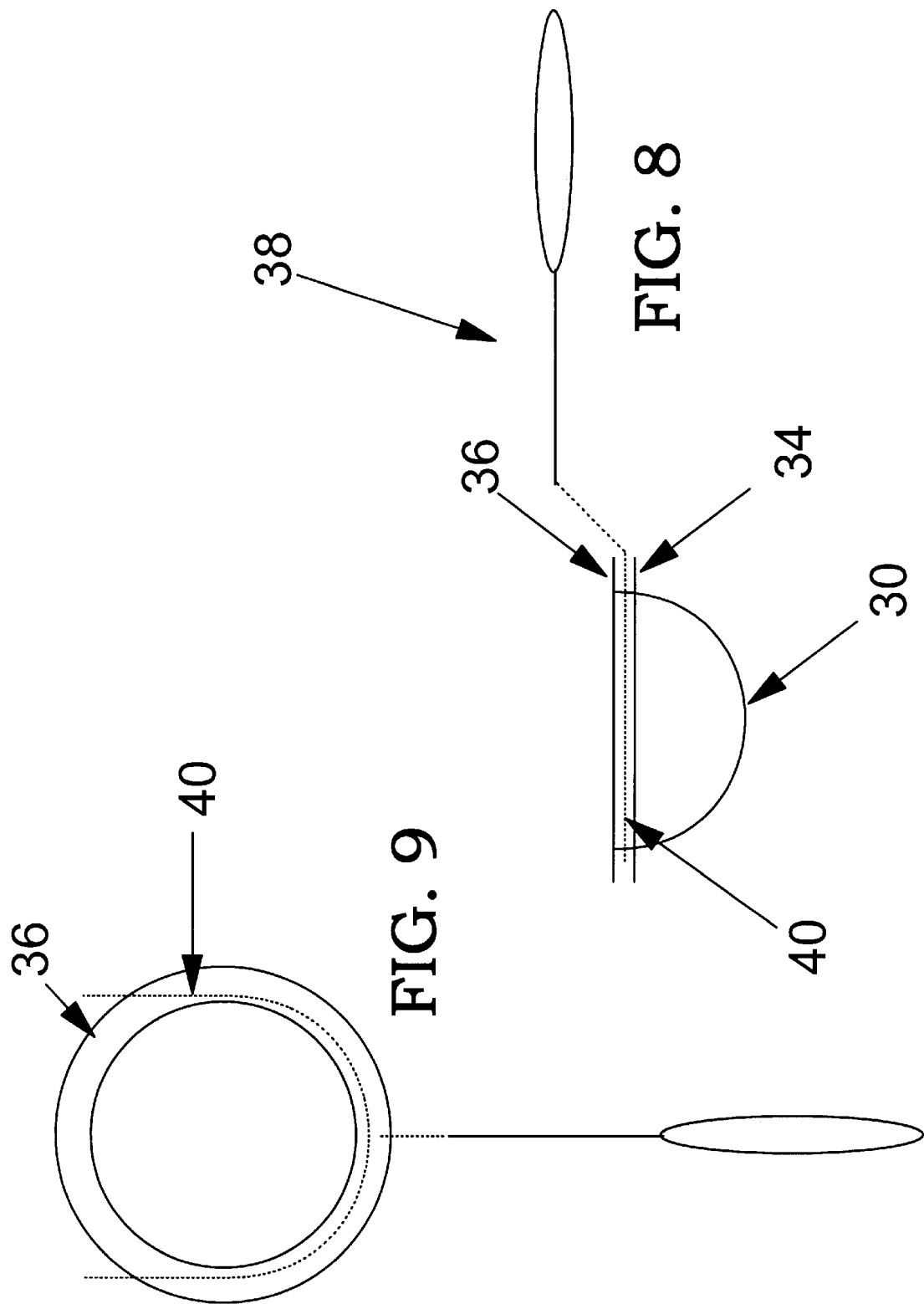

APPARATUS AND METHOD FOR COOKING FOOD

TECHNICAL FIELD OF THE INVENTION

The present invention relates to a grill for cooking food that is equipped with top and bottom cooking elements for cooking food through both sides to reduce cooking time.

BACKGROUND OF THE INVENTION

Some grills are equipped with top and bottom-heating surfaces so that meat placed between the heating surfaces is cooked from both the top and bottom sides of the meat simultaneously to reduce cooking time. Unfortunately, the cooked meat is often tough because fat contained in the meat has insufficient time to dissolve meat fibers to tenderize the meat. Fat also imports flavor to meat and, when meat is cooked very rapidly, the liquefied fat does not have sufficient time to permeate the meat to develop the full flavor. When these grills cook meat such as hamburger, pork chops, and chicken fillets, they are usually cooked done yielding dry meat, which is tough to chew. Sauces are sometimes applied to the meat after cooking to add moisture and enhance flavor. Unfortunately, applying sauces on top of the meat does not enhance flavor throughout the meat adds very little moisture. It is desirable to have a grill that can cook foods quickly without destroying the flavor or drying out the meat.

Some grills drain fat to a dish to keep it away from the meat during cooking. As the fat is removed from the meat during cooking, the meat dries and flavor is lost. To combat this tendency, meat is sometimes marinated in a mixture of vegetable oil and seasonings that are somewhat absorbed by the meat prior to the cooking which may increase the moisture content of the cooked meat. Vegetable oil tends to stay on the surface of the meat where it is removed during the cooking process even before the animal fat is rendered liquid and drained from the meat. Marinade is therefore ineffective in reducing the fat content of the cooked meat. The marinade, however, can enhance the flavor of the meat because the spices and other liquids in the marinade are absorbed deeper into the meat than the oil to enhance flavor.

While the marinade can improve the flavor of the cooked meat, its effectiveness is dependent on the liquid in the marinade displacing the liquid in the meat prior to cooking. The displacement process proceeds very slowly at refrigerator temperatures take several days for maximum displacement which is impractical in a restaurant setting because of the extra refrigerator space required. The process can be carried out faster at room temperature, but leaving meat at room temperature for the time required for the marinade to be effective gives harmful bacteria a chance to multiply. It is desirable to have a grill that can decrease the fat content of the cooked meat while retaining moisture and flavor.

When meat is cooked by heating it from the top and bottom simultaneously, rendered fat accumulates on the cooking surfaces of the grill because less evaporates due to the top-heating surface. Some grills remove the rendered fat by providing grooves in the cooking surfaces so that the fat can drain into a dish. The cooking surfaces are slanted so that the grease flows by gravity for collection. While this process does remove and capture the rendered fat, it is not practical in a restaurant setting because the rendered fat is hot and therefore hazardous. There is an opportunity for the rendered fat to spill or splatter on a worker and there is the possibility that a worker could be injured by steam exiting through the grooves from the cooking process. It is therefore desirable to have grill where grease is easily captured and removed without exposing workers to it while the meat is cooking. Accordingly, it would be appreciated, that it would be highly desirable to have a grill that captures rendered fat for safe and easy removal.

Another problem with grills is that during the cooking process, in addition to fat collecting on the grill, scraps of meat or other cooking debris also accumulate on the cooking surface and must be removed. When left on the cooking surface, the cooking debris will burn importing undesirable flavors to the food cooking. It is therefore desirable to have a simple method of removing cooking debris from the surface of the grill after each use.

BRIEF DESCRIPTION OF THE DRAWINGS

FIG. 7 is a diagrammatic top view of the bottom member illustrating the position of the heating strips and grease collection system.

FIG. 8 is a side view of a marinade cup and cup holder.

FIG. 9 is a top view of the cup and marinade holder of figure eight.

SUMMARY OF THE INVENTION

Figure 1:
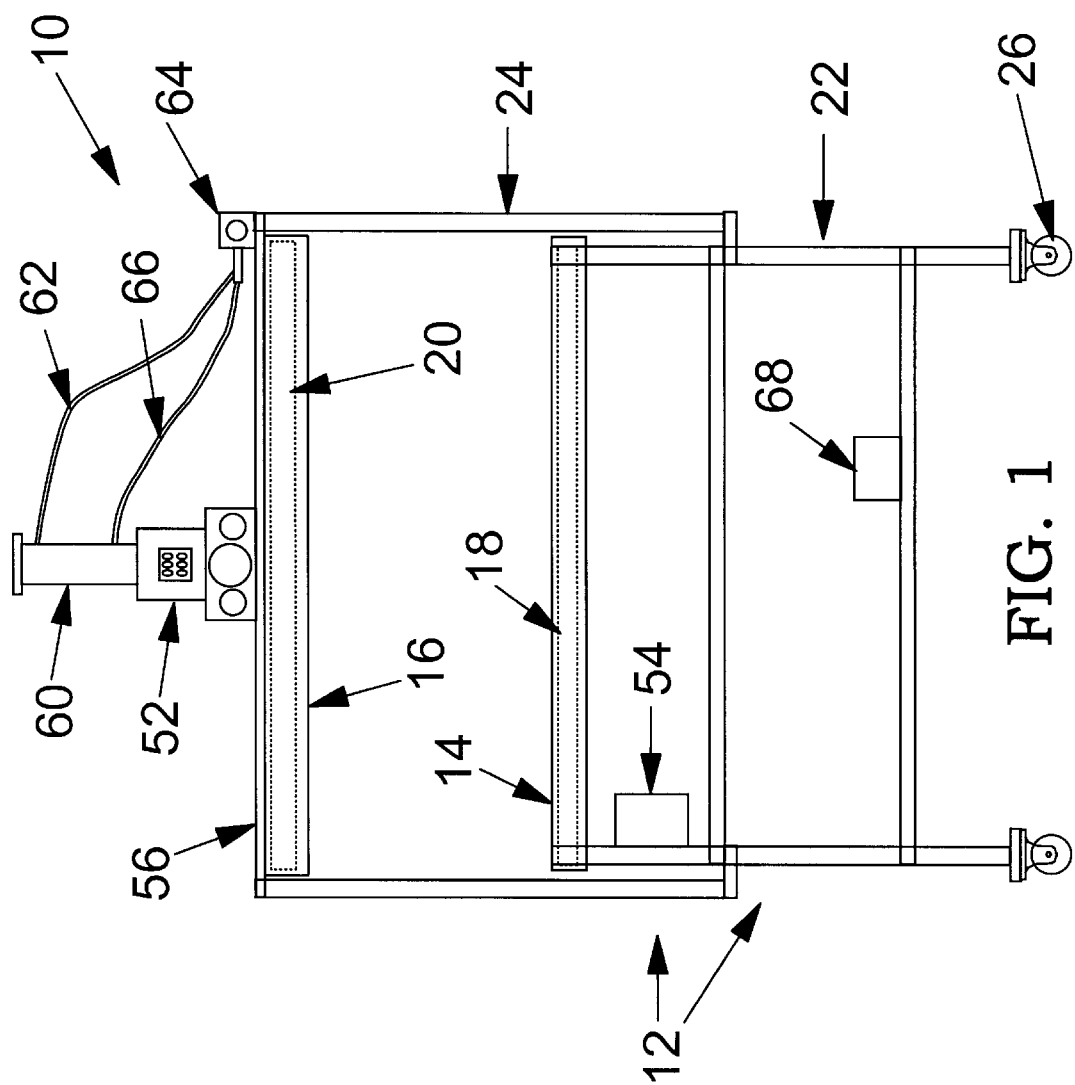
FIG. 1 is a front view of preferred embodiment of a grill for cooking meat and vegetables according to the present invention.

The present invention is directed to overcoming one or more of the problems set forth above. Briefly summarized, according to one aspect of the present invention, an apparatus for cooking food comprises a bottom member having a bottom periphery bounding a bottom cooking surface, and a top member having a top periphery bounding a top cooking surface and a skirt extending from the top periphery toward the bottom member. The top cooking surface is movable relative to the bottom cooking surface between an open position at which the top and bottom surfaces are spaced a first preselected distance from one another and a closed position at which the surfaces are spaced a second preselected distance, less than the first preselected distance, from one another and the skirt extends below the bottom cooking surface thereby creating a cooking chamber between the top and bottom cooking surfaces and the skirt.

The cooking chamber subjects the food to heat and pressure. The heat cooks and renders the fat while the pressure confines the food between the top and bottom cooking surfaces. Steam permeates the food while the pressure causes a lateral expansion forcing the food to expand outward laterally. The outward lateral expansion breaks bonds between food fibers thereby tenderizing the food.

Heating elements may be arranged so that the entire top or bottom cooking surface can be heated to the same temperature at one time or can be heated a zone or section at a time with each zone or section being heated to a different temperature to facilitate cooking different foods at the same time.

A grease collection trough extending about the periphery of the bottom cooking surface collects the rendered fat and allows cooking debris to be brushed off of the cooking surface and into the collection trough between uses.

A marinade cup holds marinade which is used to infuse moisture into the meat and to impart a particular flavor. The marinade cup is removable with a special tool so that the type of marinade can be changed with each use of the grill.

Contact sensor members are positioned on the top member to reverse downward movement of the top member or upon movement of the bottom member when a foreign object is encountered during downward movement.

These and other aspects, objects, features and advantages of the present invention will be more clearly understood and appreciated from a review of the following detailed description of the preferred embodiments and the appended claims, and by reference to the accompanying drawings.

DETAILED DESCRIPTION OF THE PREFERRED EMBODIMENTS

Referring to FIGS. 1–5, a grill 10 for cooking food contains a frame 12 which supports a bottom member 14 and top member 16 each of which contains a cooking surface, 18 and 20, respectively. The frame 12 preferably has a set of legs 22 for supporting the bottom member 14 and one or two pairs of posts 24 that extend vertically from the legs for supporting the top member 16. Preferably, the legs 22 have lockable wheels 26 for moving the grill about, and also have a height adjustment and leveling device 28, such as a jackscrew or a hydraulic jack for example. A hydraulic jack is preferred because the height of the cooking surface can be adjusted to fit the height of the user which not only varies with each work shift but can vary during a work shift as well. The jack for each particular wheel is individually controllable so that the grill may be leveled. Once the grill is leveled, the four jacks operate in concert with the same control to adjust the height of the cooking surface.

Referring to FIGS. 6–9, the bottom member 14 has a bottom periphery bounding the bottom cooking surface 18 that is slightly upturned to prevent liquids on the cooking surface 18 from spilling over the edge of the bottom member. Cooking surface 18 has a marinade cup 30 for holding a marinade used to moisturize and flavor the food that is cooking. The marinade cup maybe a separate cup member positioned in a depression or opening 32 in the cooking surface or it maybe formed from a depression formed in the cooking surface 18. Preferably, the cup 30 is a separate member positioned in the opening 32 for easy removal. The marinade cup has dual peripheral lips. A lower lip 34 makes contact with the cooking surface 18 as the cup rests in the opening 32, while an upper lip 36 that is spaced from the lower lip 34 facilitates the transport of the cup into and out of the opening. Preferably the marinade cup lips are made of rubber or plastic material that can withstand the high temperatures of the cooking surfaces without deterioration. The remainder of the marinade cup is constructed of metal or other material that will conduct the heat from heating coils imbedded in the cooking surface. The rubber or plastic lower lip 34 engages the shoulder of opening 32 to prevent liquid from exiting the cooking surface through opening 32.

A marinade cup carrier 38 is provided for inserting the marinade cup 30 in opening 32 and removing the marinade cup from the opening. The carrier handle is heat insulated and has a bifurcated distal end 40 that slides into the groove existing between the upper and lower lips of the marinade cup. The bifurcated end is bent downward from the handle to help elevate the hand of the user so that the user's hand is spaced from the cooking surface to avoid burns. The insulated end of the carrier handle can be metal with a rubber or plastic material covering that can withstand the high cooking temperatures is preferred. With the carrier handle, it is easy to replace the marinade cup so that a different marinade cup can be used for each dish or each type of food. Marinade cups can be prepared in advance to further speed cooking time. The handle also facilitates removing the marinade cup after each cooking cycle to prevent the collection of cooking debris in the marinade.

The cooking surfaces contain a plurality of grooves 42 that terminate at a grease collection slot or trough 44. The grooves 42 preferably run laterally from back to front with a varying depth slanting bottom that acts a drain for directing grease collecting in the grooves 42 to the grease collection trough 44. Ideally the grease collection trough borders the cooking surface so that grease drains from the cooking surface to the nearest grease collection trough. The trough may terminate at a drain 46 that directs the collected grease into a container 48 for disposal or recycling as appropriate (FIG. 1).

The cooking surfaces may be heated electrically with heating elements 50 such as strips or coils of heater wire imbedded beneath the cooking surfaces. The preferred arrangement for cooking with a filled grill is to have the heaters 50 spaced to uniformly heat the entire cooking surface 18 so that food cooks uniformly. To make a single grill more versatile, the cooking surface can be divided into zones with each zone having a heating element 50 to heat a portion of the cooking surface as needed for the particular items to be cooked. The marinade cup may also have heating elements 51 near it for heating the marinade. The heaters may be arranged to heat the cooking surface uniformly, and may be controlled to heat only specific portions or zones of the cooking surface as desired depending on the amount of food to be cooked, or to heat different portions or zones of the grill at different temperatures to cook more than one food at a time. A controller 52 regulates the temperatures by controlling electric current flow from electrical junction box 54 to the top and bottom members. Not only may the top and bottom cooking surfaces operate at different temperatures, but different portions of each can be operated at differing desired temperatures.

Figure 2:
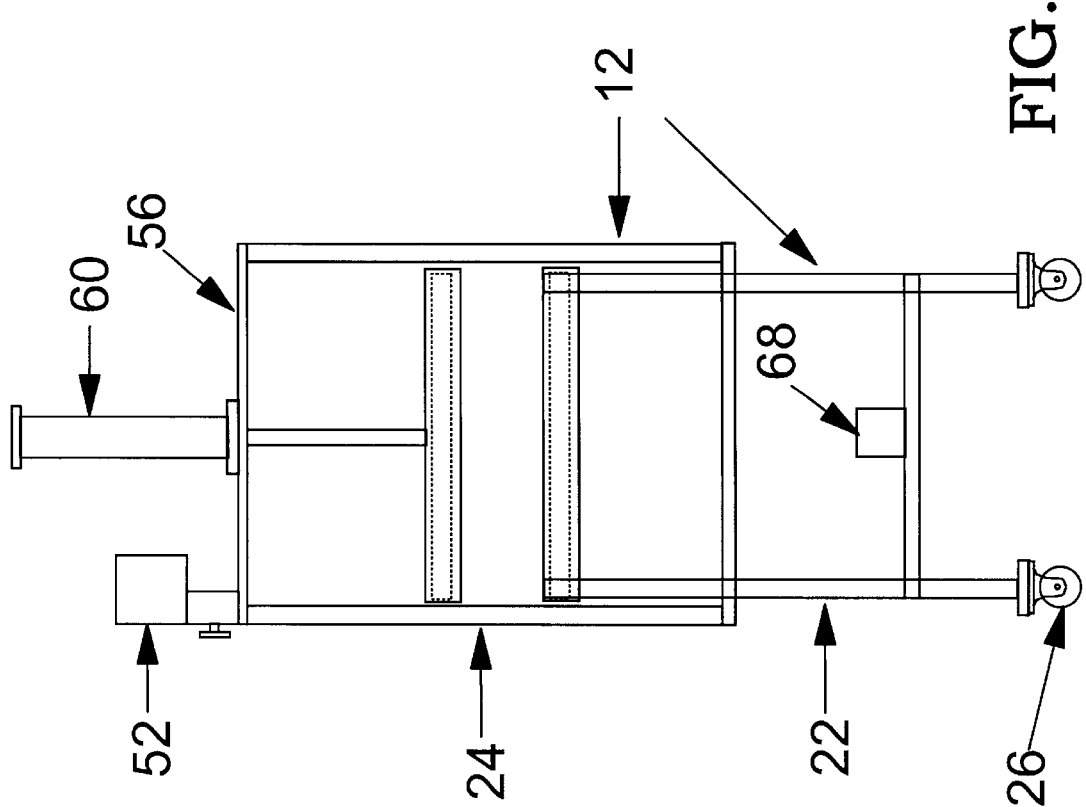
FIG. 2 is a right side view of the grill of figure one.
Figure 3:
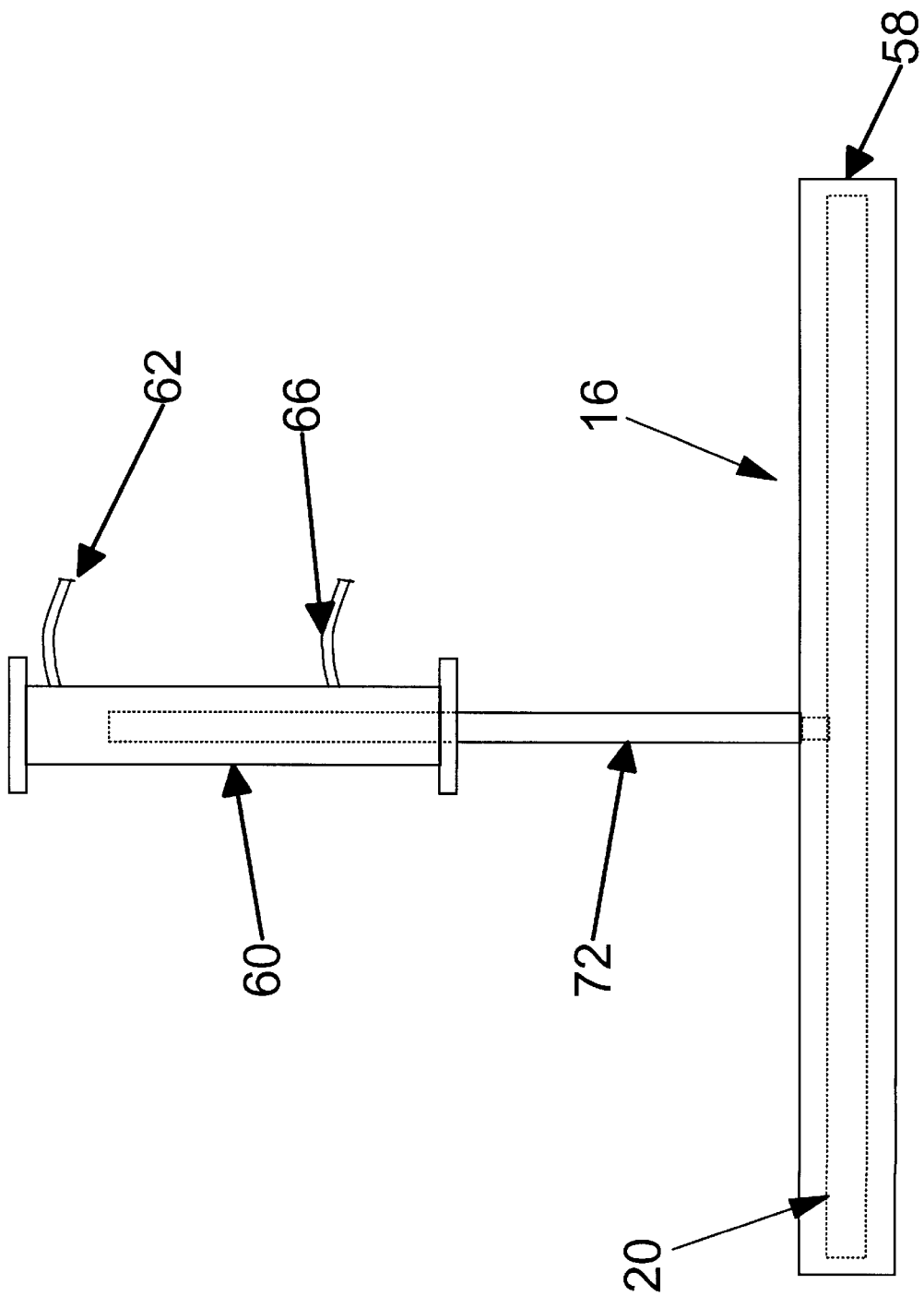
FIG. 3 is a diagrammatic front view of the grill of figure one illustrating a gas cylinder from moving the top grill member up and down.

Referring now to FIGS. 1–3, the top member 16 is supported on laterally extending members 56 attached to the frame posts 24. Cooking surface 20 of top member 16 has a top periphery bounding the top cooking surface and skirt 58 extending from the top periphery toward the bottom member 14. Cooking surface 20 also has a plurality of grooves. The top and bottom cooking surfaces are movable relative to one another. The bottom surface may remain stationary while the top cooking surface moves toward and from the bottom surface, or the top surface may remain stationary while the bottom surface moves toward and from the top surface. Also, both surfaces may move. The surfaces move relative to one another between an open position at which the top and bottom surfaces are spaced a first preselected distance from one another and a closed position at which the top and bottom surfaces are spaced a second preselected distance, less than the first preselected distance, from one another. At the closed position the skirt extends below the bottom cooking surface thereby creating a cooking chamber between the top and bottom cooking surfaces and the skirt.

Precision tooling is not required because the skirt 58 does not need to form a seal about the bottom cooking surface. Space may be left between the bottom surface and the skirt to let steam escape during cooking, and to facilitate easy separation when the food is ready. The cooking surfaces are preferably constructed of a stick resistant material or plated or coated with a material to lessen the ability of food to stick. The remainder of the grill is preferably constructed of stainless steel. The steam chamber contains vaporized marinade under pressure. The marinade permeates the meat keeping it moist.

The moving surface is preferably raised and lowered using an air cylinder 60 mounted on the laterally extended frame members 56 where it is the top surface that moves. Similarly, lateral members may be positioned lower for moving the bottom surface. Alternatively, the air cylinder may be floor mounted. Air cylinder 60 has an end connected via inlet an air hose to air pressure regulator gauge 64 and to an outlet connected via air outlet hose 66 to the regulator gauge 64. An electrically operated compressor 68 may be mounted on the frame to provide pressurized air for the air cylinder 60. Top surface 20, for example, is lowered by pushing both close buttons 70 simultaneously which causes air to flow though inlet hose 62 to the inlet and causes locking cylinder 72 to retract its rod which normally holds the top surface in the up position. Air flow through inlet hose 62 to inlet forces the cylinder to extend thereby pushing the top surface downward toward the bottom surface. During cooking, it is desirable for the gauge to register a pressure of about 140 psi which is sufficient to hold the meat down for uniform cooking and to laterally expand the meat forcing out fat and natural juices. After cooking, top surface 20 is raised by pushing the open button 74 which stops air flow to the inlet and causes air to flow through outlet hose 66 to the outlet forcing the cylinder to retract thereby lifting the top surface upward. Locking cylinder 72 extends its rod to hold the top surface in the up position. Bottom surface 18 would similarly be raised and lowered using an air cylinder that extends its rod to raise the bottom surface and retracts its rod to lower the bottom surface.

Figure 4:
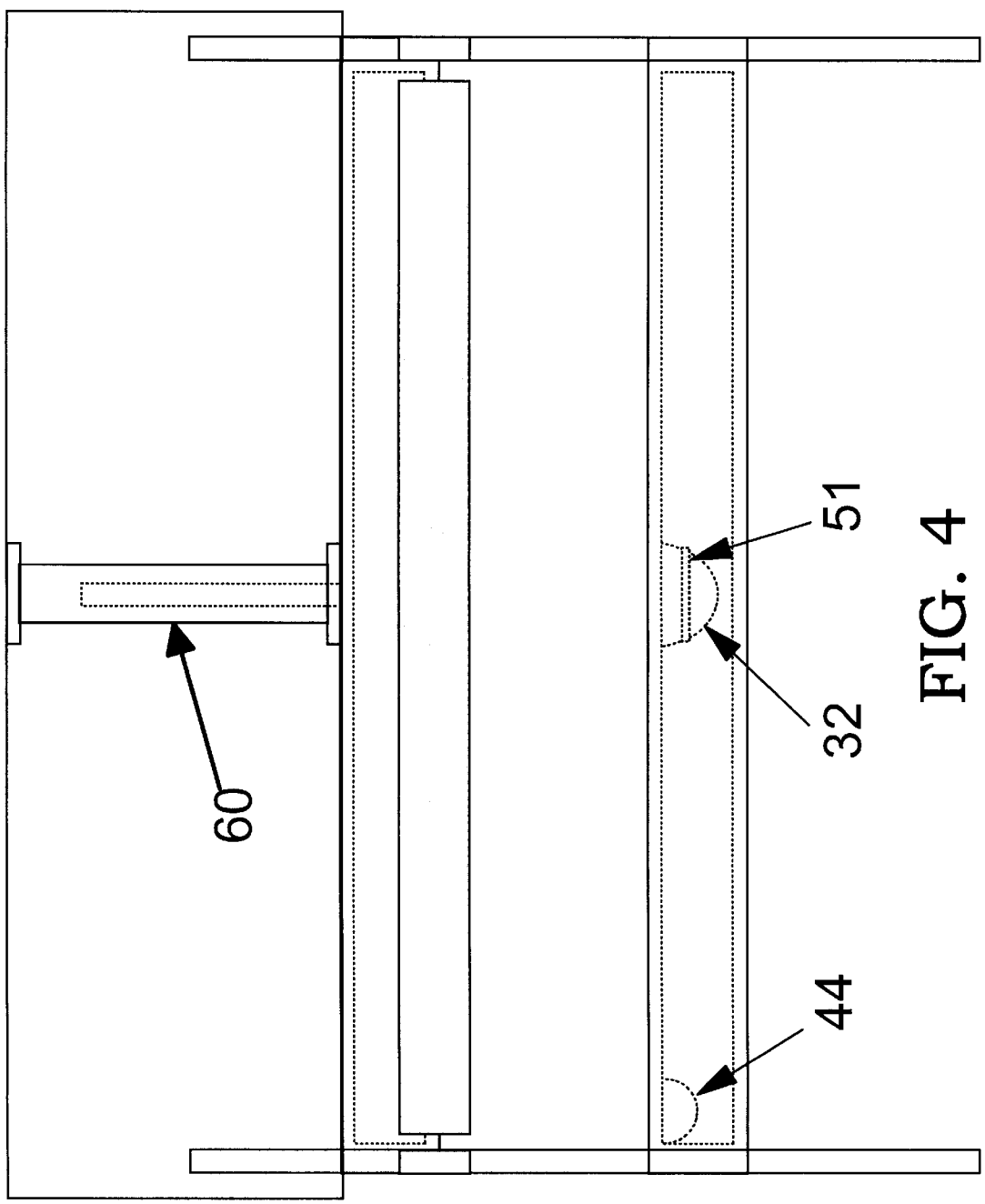
FIG. 4 is a diagrammatic side view illustrating contact sensors connected to the top member automatically raising the top member in response to encountering and object during downward motion.
Figure 5:
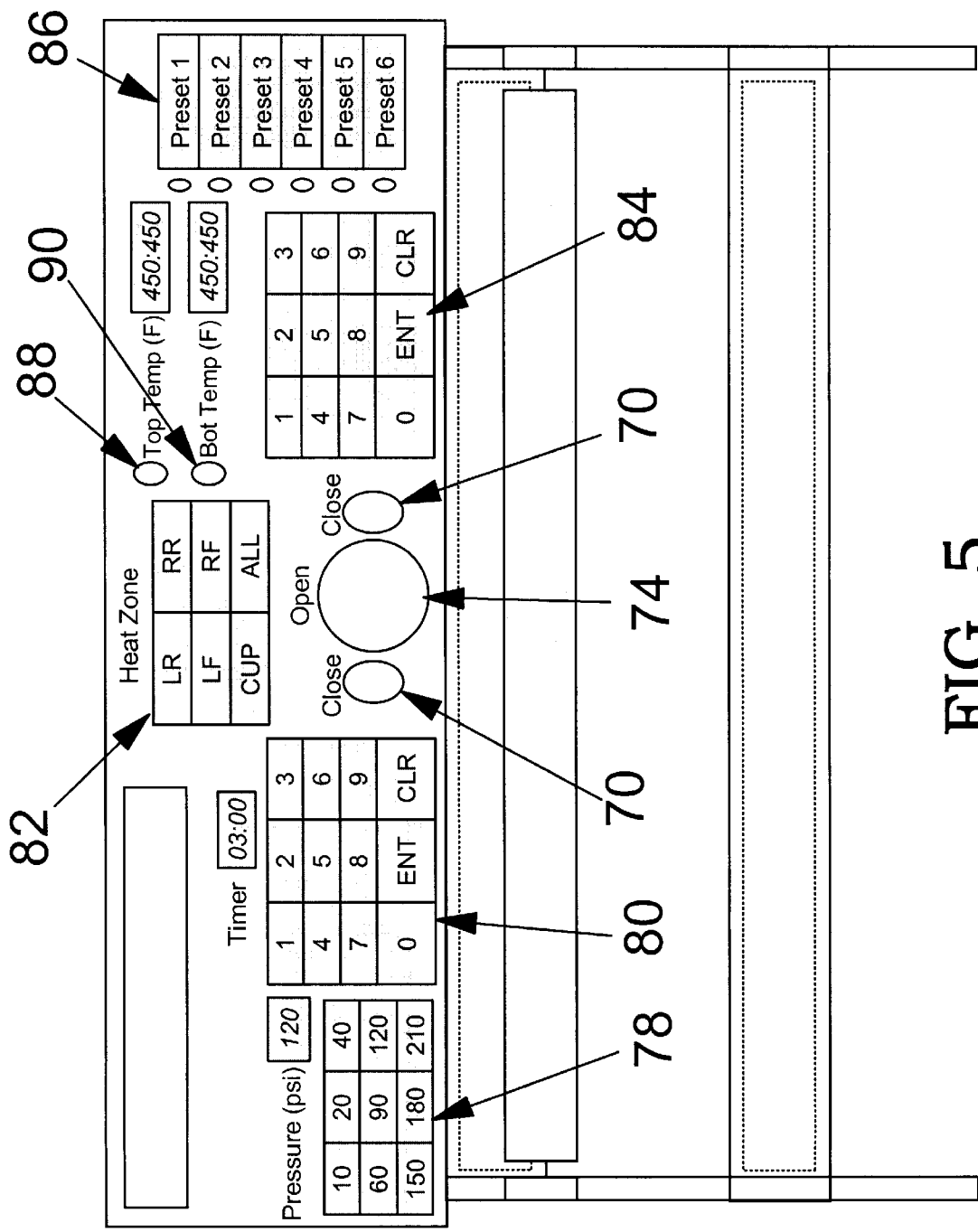
FIG. 5 is a diagrammatic front view illustrating instrument power controls.
Figure 6:
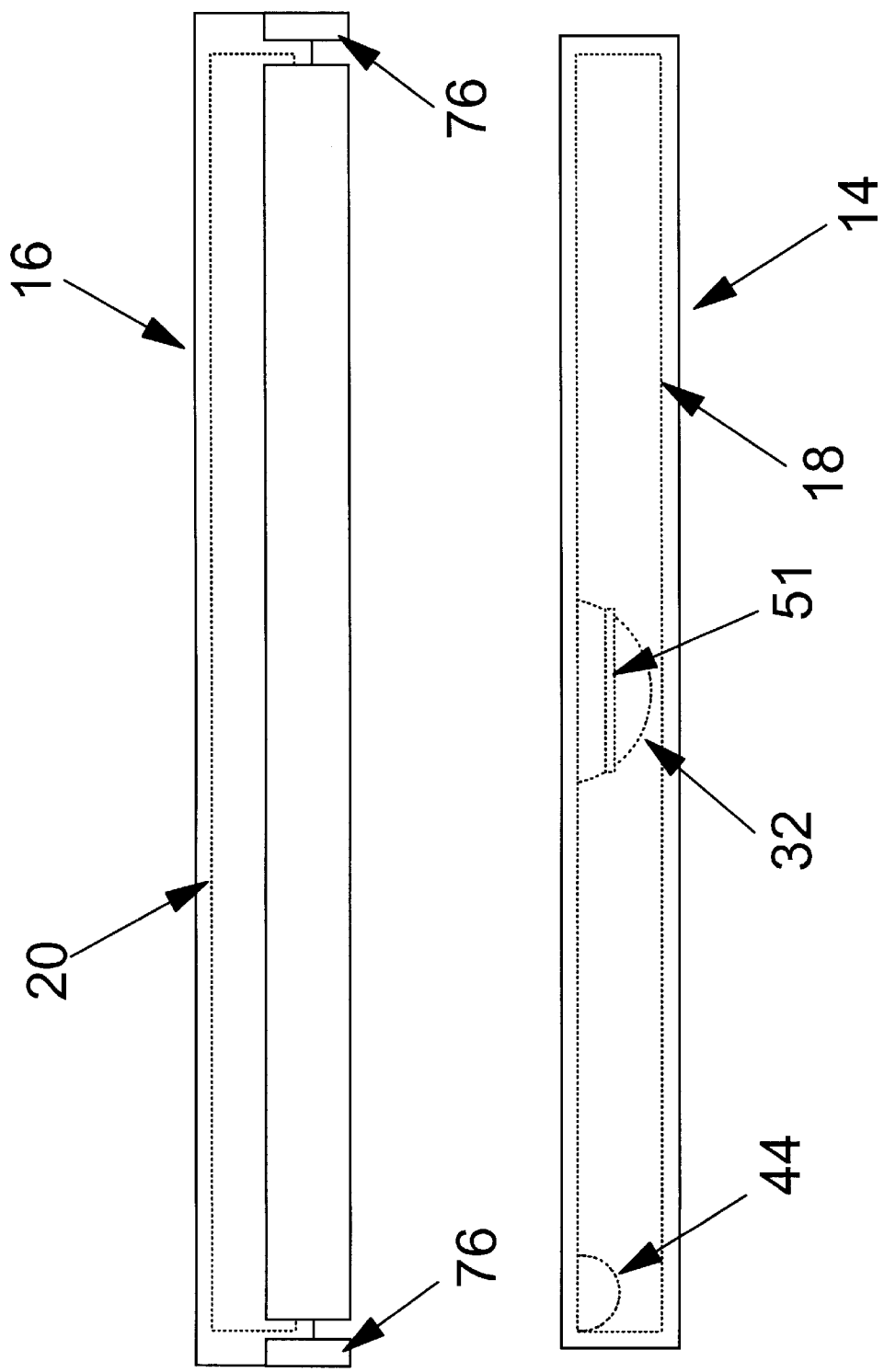
FIG. 6 is a diagrammatic side view illustrating a grease collection system of the bottom member.

Referring to FIGS. 4–6, to prevent a worker from inadvertently getting a hand or arm trapped between the cooking surfaces, contact sensor bars 76 are located on the periphery of top member 16 are connected to a switch that operates to raise the top plate. Alternatively, optical sensors could be imbedded in the top and bottom cooking members so that a person sticking a hand or arm between the two cooking members would break communication between the emitter located in one cooking member and the receiver located in the other cooking member thereby generating a signal to cease downward motion of the top cooking member or to reverse motion of the top cooking member from downward to upward. The sensor or contact bar arrangement serves to reduce the risk of having the top cooking member accidentally or inadvertently descend while someone is working around the press cooker with a body member extended between the top and bottom cooking members.

FIG. 5 illustrates a control panel for controller 52. The control panel has a pressure touch pad 78 used for setting the pressure to be applied to the food by the cooking surfaces. It has touch pads for setting cooking time 80, selecting heating zones 82 and setting temperatures 84. It also has a touch pad 86 for presetting pressure, time, temperature and heating zones. Values for pressure, cooking time, top cooking surface temperature and bottom cooking surface temperature can be keyed manually by an operator.

To manually set pressure, the operator depresses one of the predetermined pressure levels on pressure pad 78. Cooking time is set by depressing numbers on time touch pad 80 as is commonly done with microwave ovens and other appliances. To manually set the temperature for the top cooking surface, the operator touches the button 88 for top temperature, keys in numbers on touch pad 84 that correspond to the desired temperature in degrees Fahrenheit, and then presses ENT to enter the data. The LED display adjacent button 88 will show both the desired temperature and the actual temperature of the cooking surface. To manually set the temperature for the bottom cooking surface, the operator touches the button 90 for top temperature, keys in numbers on touch pad 84 that correspond to the desired temperature in degrees Fahrenheit, and then presses ENT to enter the data. The LED display adjacent button 90 will show both the desired temperature and the actual temperature of the cooking surface. By default, the operator can set both cooking surfaces to the same temperature simultaneously by merely keying in the desired temperature and pressing ENT.

The grill may incorporate the use of heating zones that allow different temperatures to be set for different areas of the cooking surfaces. In addition, these heating zones will allow for more efficient power usage when only a portion of the grill cooking surfaces are needed. For example, the grill may have the five heating zones designated on heating zone touch pad 82 which are left front quadrant, right front quadrant, left rear quadrant, right rear quadrant and marinade cup. The default setting is ALL, for all of the zones to be set at the same temperature.

The control panel may have a number of preset buttons 86 that can be programmed by the operator. Pressing any of the six buttons will automatically set all of the previously described settings for pressure, time and temperature. The preset buttons can be programmed by manually setting the other controls and then depressing a preset button and holding for a second or two, much the same way automobile radios are programmed to particular stations.

The control panel also has the open button 74 and the two close buttons 70. The closing operation which moves the top and bottom cooking surface toward one another requires the simultaneous pushing of both close buttons 70. This feature reduces the possibility of inadvertently closing the cooking surfaces because a conscious effort is needed to touch both buttons simultaneously when they are positioned on either side of open button 74.

Operation of the present invention results in meat that is moist and tasty. Operation is begun by pushing the up button causing the controller to direct pressurized air from the pump to the outlet hose via the pressure regulator to retract the piston of the air cylinder thereby raising the top cooking surface. When the top cooking surface is raised, the locking cylinders extend their rods to support the top surface. The cooking surfaces and cup are brought to cooking temperature and the meat or other food is placed on the bottom cooking surface. Marinade is added to the cup before pushing the down button which causes the pump to direct pressurized air via the inlet hose and pressure regulator to the air cylinder to extend the rod thereby lowering the top surface. The air pressure is increased to press the top surface against the food with a predetermined pressure. Cooking is accomplished with heat from the top and bottom surfaces and from the heated marinade, marinade vapor and water vapor from the food. After cooking for a predetermined length of time, the "up" button is pushed again to raise the top surface and stop the cooking. The food is ready and can be removed from the grill.

The meat may be seasoned prior to cooking or seasoned with the marinade during cooking. The vapor injected into the meat during cooking liquefies the fat and replaces the fat which drains away to the collection trough. Meat is placed on the heated grill, and the top cooking surface is lowered and presses on the meat so that the vapor can tenderize it while flavoring it. After a predetermined cooking time, the top cooking surface is raised and the cooked meat is removed. Depending on the particular combination, different meats can be cooked together and vegetables can also be cooked at the same time. Meats using the same marinade can be cooked together although their cooking times may vary. Their cooking temperatures can be varies so that both cook in the same amount of time.

It can now be appreciated that an apparatus and method for cooking food quickly while keeping meat moist and tender has been presented. The apparatus includes a bottom member having a bottom periphery bounding a bottom cooking surface, means for controllably heating the bottom cooking surface, a top member having a top periphery bounding a top cooking surface and a skirt extending from the top periphery toward the bottom cooking surface. The top cooking surface is vertically movable relative to the bottom cooking surface between an open position for loading the apparatus with food to be cooked and a closed position for cooking the food.

The skirt extends below the bottom cooking surface to create a steam chamber between the top and bottom cooking surfaces and the skirt. The skirt fits loosely about the bottom surface so that it does not bind. The loose fit, however, does not interfere with the ability to trap steam because the propensity of hot steam is to rise upward away from the gap between the skirt and bottom cooking surface. Steam in the steam chamber becomes superheated because it is confined. Superheated steam penetrates the meat to help cook it, rendering fat and breaking bonds between meat fibers which tenderizes the meat. As bonds break, the pressure of the cooking surfaces causes the meat to expand laterally parallel to the cooking surfaces producing a more uniform thickness. Also, when bonds break, spaces are created to retain moisture from the marinade to thereby improve the flavor and texture of the meat.

The method for cooking food comprises heating the bottom cooking surface of the bottom grill member to a first predetermined temperature and heating a top cooking surface of the top grill member to a predetermined temperature. The temperatures may be the same or different, and different zones of the cooking surfaces may attain different preselected temperatures. If not already raised, the next step is raising the top surface vertically to the open position and loading the bottom cooking surface with food. The food may be pre-seasoned with spices and seasonings, but it is not necessary to do so. The step of adding a marinade of spices, seasonings and juices to the marinade cup will sufficiently season the food. After loading the grill with food, the top cooking surface is vertically lowered to the closed position. Press cooking requires forcing the top surface down into contact with the food at a pressure sufficient to confine the food between the cooking surfaces so that the fat can be rendered and the marinade permeated throughout the food. A pressure in the range of about 120 psi to about 160 psi is required for press cooking with a pressure of about 140 psi being optimum. At pressures below about 120 psi, meat fries or brazes and retains or absorbs liquefied fat. At pressures greater than about 160 psi, it is difficult to prevent meat from burning.

The method includes heating the marinade in the cup creating a marinade vapor, driving the marinade and marinade vapor into the food for rupturing bonds between food fibers and permeating the food replacing fat and juices with the marinade, and draining the fat and juices to the grease collection trough. After cooking the food for a predetermined length of time, the top surface is raised to the open position, and the food is removed. Cooking time varies with the particular meat and the bulk of the meat. At temperatures of about 450° F. for the cooking surfaces and about 600° F. for the marinade cup, hamburgers cook in about fifty seconds, fish about two minutes, chicken about three minutes, pork chops about five minutes, steaks about six minutes, and pork spare ribs about eight minutes or ten minutes if it is desired to have the meat separate from the bone.

While the invention has been described with particular reference to the preferred embodiments, it will be understood by those skilled in the art that various changes may be made and equivalents may be substituted for elements of the preferred embodiments without departing from invention. For example, the air cylinder and pneumatic controls may be replaced with electric motors and controls where total electric operation is desired. The controller may include a timer to cut power to the heating elements after a predetermined time or when certain conditions are satisfied. The controller may also automatically open the grill when cooking is done. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, the top grill member may be ceiling mounted eliminating the frame posts to provide great accessibility to the cooking surfaces. It is accordingly intended that the claims shall cover all such modifications and applications as do not depart from the true spirit and scope of the invention

What is claimed is:

1. An apparatus, comprising:
   a bottom member having a bottom periphery bounding a bottom cooking surface, said bottom cooking surface having a central opening and a plurality of grooves, said cooking surface member having a grease collection trough connected to said plurality of grooves;
   first heating means for controllably heating said bottom cooking surface;
   a marinade cup positioned in said bottom cooking surface central opening;
   second heating means for controllably heating said marinade cup;
   a top member having a top periphery bounding a top cooking surface, said top cooking surface being movable relative to said bottom cooking surface between an open position at which said top and bottom cooking surfaces are spaced a first preselected distance from one another and a closed position at which said cooking surfaces are spaced a second preselected distance from one another, said first preselected distance being greater than said second preselected distance;
   third heating means for controllably heating said top cooking surface; and
   moving means for controllably moving said top cooking surface relative to said bottom cooking surface.

2. An apparatus, as set forth in claim 1, including a skirt extending from said top periphery of said top member toward said bottom member, said top member being movable between an open position at which said skirt is vertically spaced from said bottom member and a closed position at which a lower portion of said skirt extends below said bottom cooking surface creating a chamber between said top and bottom members and said skirt.

3. An apparatus, as set forth in claim 1, wherein said moving means includes a gas cylinder having a gas inlet for metering gas to move said top and bottom members to the closed position to compress food, said inlet gas being at a pressure in a range of about 120 psi to about 160 psi when said food is cooking.

4. An apparatus, as set forth in claim 1, including a plurality of legs attached to and supporting said bottom member, each of said legs having a lockable wheel.

5. An apparatus, as set forth in claim 1, including a plurality of legs attached to and supporting said bottom member, each of said legs having, a height adjustment and leveling device.

6. An apparatus, as set forth in claim 5, wherein said height adjustment and leveling device includes a hydraulic jack that is individually controllable for leveling said bottom member.

7. An apparatus, as set forth in claim 1, wherein said marinade cup has a lower peripheral lip making contact with said bottom cooking surface as said marinade cup sits in said central opening and has an upper peripheral lip spaced from said lower peripheral lip.

8. An apparatus, as set forth in claim 1, wherein said marinade cup has dual peripheral lips with a lower elastomeric lip sealingly contacting a shoulder of said central opening to prevent liquid from exiting said bottom cooking surface through said central opening.

9. An apparatus, as set forth in claim 1, including a marinade cup carrier having an insulated handle and a bifurcated distal end adapted to engage said marinade cup.

10. An apparatus, as set forth in claim 9, wherein said bifurcated end is bent downward from said handle so that said handle is elevated relative to said marinade cup thereby elevating a hand of a user from said bottom cooking surface.

11. An apparatus, as set forth in claim 1, wherein said plurality of grooves terminate at a grease collection trough.

12. An apparatus, as set forth in claim 11, wherein said grooves run laterally from back to front with a varying depth slanting bottom that directs grease to said grease collection trough.

13. An apparatus, as set forth in claim 11, wherein said grease collection trough borders said bottom cooking surface so that grease drains from the cooking surface to said grease collection trough.

14. An apparatus, as set forth in claim 1, wherein said bottom cooking surface is divided into a plurality of zones and wherein said first heating means heats each zone as needed.

15. An apparatus, as set forth in claim 14, including a control panel having a digital layout with a timer and touch pads for entering cooking time and temperature by zone.

16. An apparatus, as set forth in claim 14, including a pressure touch pad for varying the pressure with which said top member is lowered unto said bottom member.

17. An apparatus, as set forth in claim 1, including contact sensor bars attached to said top member and connected to a switch that operates to raise said top member.

18. An apparatus, as set forth in claim 1, including optical sensors attached to said top and bottom members and connected to a switch to raise said top member whenever optical communication between said sensors is interrupted.

19. A method for cooking food, comprising the steps of:

controllably heating cooking zones of a cooking surface of a bottom grill member, said cooking surface having a plurality of grooves and containing a marinade cup, said bottom grill member having a grease trough;

controllably heating cooking zones of a cooking surface of a top grill member;

raising said top grill member to an open position;

loading said bottom cooking surface with food;

adding a marinade of spices, seasonings and juices to said marinade cup;

lowering said top grill member to a closed position;

forcing said top grill member down into contact with said food;

heating said marinade cup and creating a marinade vapor;

driving said marinade through said grooves into said food and rupturing bonds between food fibers and permeating said food replacing fat with said marinade;

draining fat through said grooves into said grease collection trough;

cooking the food at predetermined temperatures for predetermined lengths of time;

raising said top surface to the open position; and removing the cooked food.

20. The method of claim 19, wherein the forcing step includes forcing said top cooking surface down onto the food at a pressure in a range of about 120 psi to about 160 psi.

* * * * *